United States Patent Office.

GUSTAVE BOURGADE, OF NEW YORK, N. Y.

Letters Patent No. 106,112, dated August 9, 1870.

IMPROVEMENT IN THE PREPARATION OF ALBUMEN.

The Schedule referred to in these Letters Patent and making part of the same

To all whom it may concern:

Be it known that I, GUSTAVE BOURGADE, of the city and State of New York, have invented an Improvement in the Preparation of Albumen; and the following is declared to be a correct description of the same.

In the manufacture of albumen, by the processes heretofore in use, the albumen was not entirely extracted from the blood, and many impurities passed out of the blood with the albumen, as it was allowed to run from the coagulated mass.

My invention is made with a view to coagulating all the matter except the albumen contained in the blood, and then extracting a large proportion of the albumen in a nearly pure condition.

The albumen, I find, will be extracted economically and rapidly by the following method:

Fresh blood is subjected to a rapid stirring operation for about five minutes, to separate the fibrin or comparatively solid matter, that will adhere to the stirrer, or can be gathered out in a spongy mass, and squeezed. I prefer to use this preliminary operation, but do not limit myself in this particular.

I take blood, either after it has been subjected to the foregoing operation, or in its usual condition, and add about ten per cent. of alkali, such as slaked lime, and also about twenty-five per cent. of water. The mass is thoroughly stirred, and then put into a suitable still or evaporating vessel, by means of which the water added, or a portion thereof, may be evaporated at as low a temperature as convenient.

The vapor may be condensed, and contains traces of ammonia.

The mass remaining is of a spongy character, the coloring matter, fibrin, and other substances, except the albumen, being sufficiently acted upon by the alkali to be retained in a mass, while the albumen is extracted by mechanical force, such as pressure in any suitable press, atmospheric pressure, or filtration into an exhausted receiver, or a centrifugal drying apparatus, the albumen being received in a liquid state and of a very good quality.

The liquid albumen may be concentrated, by evaporation, in a vacuum, and then exposed in shallow pans for drying.

The lime may be mixed with the blood at the slaughter-house, and then barreled for shipment, so as to aid in preserving said blood from decomposition previous to the other operations described.

I claim as my invention—

The process, substantially as herein specified, for separating albumen from blood.

Dated this 24th day of May, A. D. 1870.
       GUSS. BOURGADE.

Witnesses:
 HAROLD SERRELL,
 GEO. T. PINCKNEY.